(12) United States Patent
Tanimori et al.

(10) Patent No.: US 11,816,803 B2
(45) Date of Patent: Nov. 14, 2023

(54) GUIDANCE DISPLAY SYSTEM AND SERVER OF GUIDANCE DISPLAY SYSTEM

(71) Applicant: TOYOTA JIDOSHA KABUSHIKI KAISHA, Toyota (JP)

(72) Inventors: Shunsuke Tanimori, Nagoya (JP); Kazumi Serizawa, Toyota (JP); Sayaka Ishikawa, Miyoshi (JP); Kazuki Komoriya, Toyota (JP); Masaya Miura, Toyota (JP); Kouji Tamura, Tokyo (JP); Seiei Hibino, Nagakute (JP); Rina Mukai, Toyota (JP); Tomoya Inagaki, Miyoshi (JP); Chinli Di, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 17/554,250

(22) Filed: Dec. 17, 2021

(65) Prior Publication Data

US 2022/0198763 A1 Jun. 23, 2022

(30) Foreign Application Priority Data

Dec. 21, 2020 (JP) ................................. 2020-211147

(51) Int. Cl.
*G06T 19/00* (2011.01)
*G06V 10/70* (2022.01)
(Continued)

(52) U.S. Cl.
CPC ........ *G06T 19/006* (2013.01); *G01C 21/3461* (2013.01); *G01C 21/3647* (2013.01);
(Continued)

(58) Field of Classification Search
None
See application file for complete search history.

(56) References Cited

U.S. PATENT DOCUMENTS 5,964,821 A * 10/1999 Brunts ............... G01C 21/3611
701/487
7,769,596 B1 * 8/2010 Nair ....................... G06Q 30/02
705/1.1

(Continued)

FOREIGN PATENT DOCUMENTS

JP 2014-020863 A 2/2014

*Primary Examiner* — David H Chu
(74) *Attorney, Agent, or Firm* — Sughrue Mion, PLLC

(57) ABSTRACT

A guidance display system includes an AR display device and a server. The AR display device includes a display unit and a display control unit configured to display, on the display unit, an augmented reality image in which an image of a virtual object for guidance is superimposed on scenery of a real world. The server is wirelessly connected to the display device. The server includes a theme park-specific character storage unit, a 3D model extraction unit, and a transmission unit. The theme park-specific character storage unit stores character information set for a theme park. The 3D model extraction unit extracts the character of the theme park set as the destination, as a virtual object for guidance. The transmission unit transmits the image data of the extracted virtual object for guidance to the display control unit of the AR display device.

12 Claims, 14 Drawing Sheets

(51) Int. Cl.
*G01C 21/34* (2006.01)
*G08G 1/16* (2006.01)
*G01C 21/36* (2006.01)
*G08G 1/0968* (2006.01)

(52) U.S. Cl.
CPC ....... *G06V 10/70* (2022.01); *G08G 1/096855* (2013.01); *G08G 1/16* (2013.01)

(56) References Cited

U.S. PATENT DOCUMENTS

| | | | | |
|---|---|---|---|---|
| 8,301,372 | B2* | 10/2012 | Herbst | G06T 19/006 |
| | | | | 345/530 |
| 9,230,415 | B2* | 1/2016 | Gromley | G06Q 40/12 |
| 9,892,371 | B1* | 2/2018 | Cronin | G06Q 30/0261 |
| 10,338,377 | B1* | 7/2019 | Milanović | G02B 26/0833 |
| 2005/0172230 | A1* | 8/2005 | Burk | B60K 35/00 |
| | | | | 715/728 |
| 2011/0141115 | A1* | 6/2011 | Brandes | G09B 29/008 |
| | | | | 345/428 |
| 2012/0263154 | A1* | 10/2012 | Blanchflower | G06T 19/006 |
| | | | | 455/414.1 |
| 2014/0089862 | A1* | 3/2014 | Jones | A63F 13/5375 |
| | | | | 715/851 |
| 2014/0107917 | A1* | 4/2014 | Kazawa | G01C 21/3682 |
| | | | | 701/457 |
| 2015/0134738 | A1* | 5/2015 | Mayo | H04W 4/025 |
| | | | | 709/204 |
| 2015/0207644 | A1* | 7/2015 | An | H04W 4/024 |
| | | | | 455/420 |
| 2015/0339091 | A1* | 11/2015 | Yamaguchi | G06F 3/147 |
| | | | | 345/2.1 |
| 2016/0345137 | A1* | 11/2016 | Ruiz | H04W 4/024 |
| 2017/0248434 | A1* | 8/2017 | Best | G01S 19/14 |
| 2017/0313546 | A1* | 11/2017 | King | B66B 1/468 |
| 2018/0080774 | A1* | 3/2018 | Sink | G06Q 10/10 |
| 2018/0328751 | A1* | 11/2018 | Bejot | G01C 21/3608 |
| 2019/0204601 | A1* | 7/2019 | Ha | G02B 27/0172 |
| 2022/0028114 | A1* | 1/2022 | Lee | G06T 7/75 |
| 2022/0103985 | A1* | 3/2022 | Khasnabish | H04W 4/50 |
| 2022/0392168 | A1* | 12/2022 | Wu | G06T 19/003 |
| 2023/0039100 | A1* | 2/2023 | Melkote Krishnaprasad | |
| | | | | G02B 27/0093 |

* cited by examiner

GUIDANCE DISPLAY SYSTEM AND SERVER OF GUIDANCE DISPLAY SYSTEM

CROSS-REFERENCE TO RELATED APPLICATION

This application claims priority to Japanese Patent Application No. 2020-211147 filed on Dec. 21, 2020, incorporated herein by reference in its entirety.

BACKGROUND

1. Technical Field

The present specification discloses a guidance display system and a server of the guidance display system.

2. Description of Related Art

A guidance display device using augmented reality (AR) technology has been known. For example, in Japanese Unexamined Patent Application Publication No. 2014-20863 (JP 2014-20863 A), in a navigation system, an image of a character traveling along a route to a destination is superimposed on an image of the real world to be displayed.

SUMMARY

In a complex entertainment facility including a plurality of theme parks, for example, characters may be set for each theme park. In this case, when displaying a guidance with a predetermined theme park set as a destination, a character image that does not match the concept of the theme park may be displayed.

Thus, the present specification discloses a guidance display system and a server of the guidance display system that can display guidance using an augmented reality image without impairing the concept of a facility such as a theme park serving as a destination.

The present specification discloses a guidance display system that displays guidance to a destination, with a facility configured based on a specific theme being set as the destination. The system includes a display device and a server. The display device includes a display unit and a display control unit configured to display, on the display unit, an augmented reality image, in which an image of a virtual object for guidance is superimposed on scenery of a real world. The server is wirelessly connected to the display device. The server includes a storage unit, an extraction unit, and a transmission unit. The storage unit stores information on a character set for the facility. The extraction unit extracts the character of the facility set as a destination, as the virtual object for guidance. The transmission unit transmits image data of the extracted virtual object for guidance to the display control unit.

With the above configuration, the character corresponding to the destination facility (for example, theme park) is displayed as the virtual object for guidance. Therefore, guidance can be displayed without impairing the concept of the destination facility.

In the above configuration, the server may include a user calculation unit and a route search unit. The user calculation unit calculates a user density of each of a plurality of the facilities. The facilities are configured based on different themes. The route search unit creates a guidance route to the destination, with a facility, out of the facilities, having the lowest user density at a time of setting the destination being set as the destination.

With the above configuration, a less crowded facility (for example, theme park) is set as a destination, so that the congestion rates of the facilities can be smoothed.

In the above configuration, the extraction unit may extract a character of a facility that is closest to the display device at the time of setting the destination, as a virtual object for seeing off. In this case, the transmission unit transmits image data of the extracted virtual object for seeing off to the display control unit.

With the above configuration, in addition to the virtual object for guidance, the virtual object for seeing off can be displayed in the augmented reality image. Therefore, it is possible to produce an effect that the virtual object for seeing off accompanies the user halfway through the travel from the facility that the user has exited to the next facility, for example.

In the above configuration, the display device may include an imaging unit that captures an image of the scenery of the real world, and an image recognition unit that recognizes an object included in the captured image. In this case, when the image recognition unit recognizes a warning target object in the captured image, the display control unit highlights the warning target object on the display unit.

With the above configuration, it is possible to suppress the user of the display device from coming into contact with the warning target object.

In the above configuration, the route search unit may create the guidance route such that the guidance route functions as a route for avoiding the warning target object.

With the above configuration, the user of the display device can avoid the warning target object.

In the above configuration, when a plurality of the display devices comes close to each other within a predetermined threshold distance, the route search unit recreates a guidance route for avoiding each of the display devices.

With the above configuration, contact between the users of the display devices can be avoided.

In the above configuration, the display device may be an optical see-through display including a half mirror through which an image of the scenery of the real world is transmitted and onto which the virtual object for guidance is projected.

The present specification discloses a server of a guidance display system. The server is wirelessly connected to a display device. The display device is configured to display an augmented reality image in which an image of a virtual object for guidance is superimposed on scenery of a real world. The server includes a storage unit, an extraction unit, and a transmission unit. The storage unit stores information on a character set for a facility configured based on a specific theme. The extraction unit extracts the character of the facility set as a destination, as the virtual object for guidance. The transmission unit transmits image data of the extracted virtual object for guidance to the display device.

With the guidance display system and the server of the guidance display system disclosed in the present specification, guidance can be displayed using augmented reality technology without impairing the concept of the destination facility.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
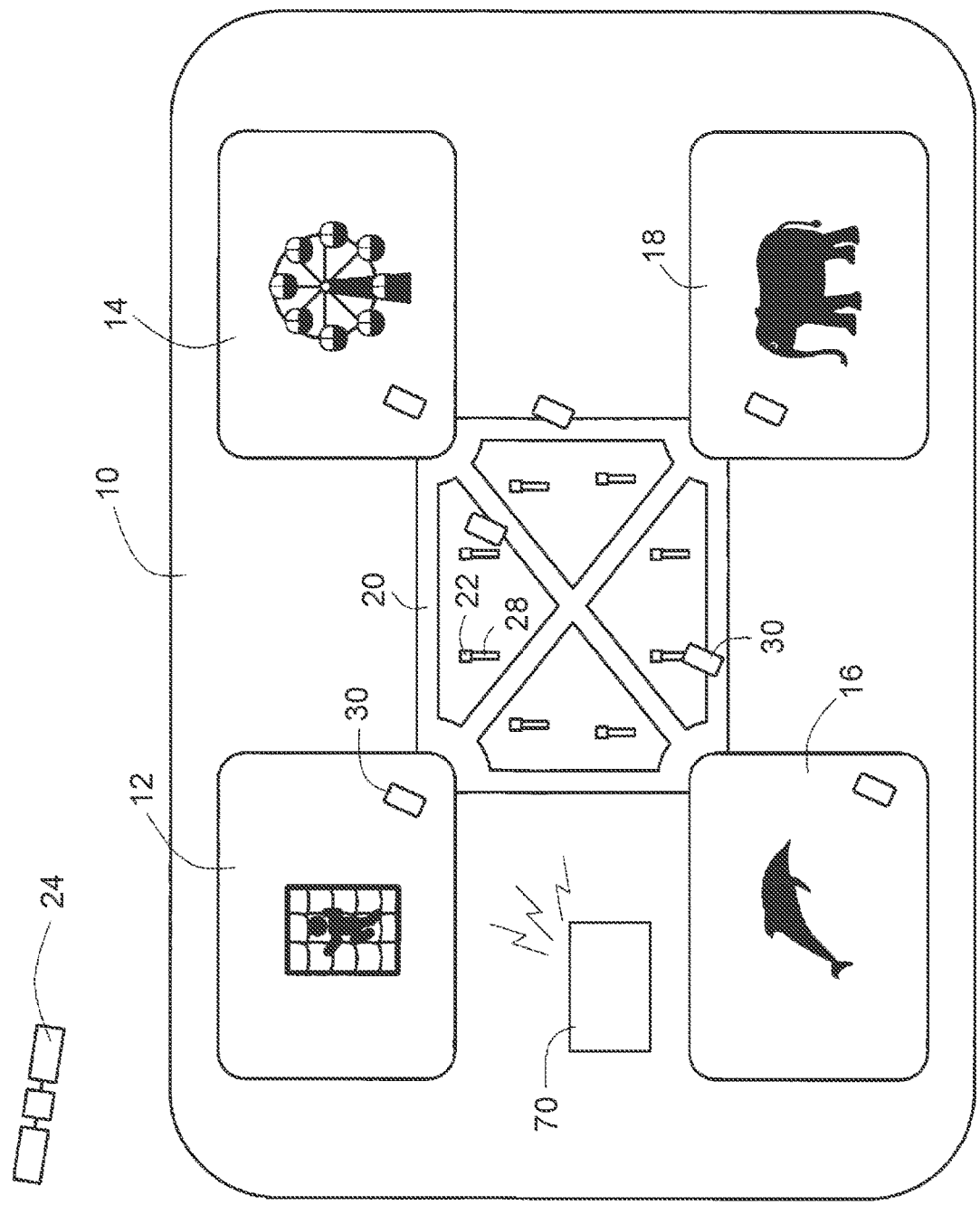
FIG. 1 is a diagram illustrating a complex entertainment facility including a guidance display system according to the present embodiment.

FIG. 1 illustrates a complex entertainment facility 10. In this facility, a guidance display system according to the present embodiment is used. The complex entertainment facility 10 includes a plurality of theme parks 12 to 18. The theme park refers to a facility having a concept based on a specific theme (subject) and including facilities, events, scenery, and the like that are comprehensively organized and directed based on that concept. The theme parks 12 to 18 are connected by a connecting passage 20, and users can come and go between the theme parks 12 to 18 through the connecting passage 20.

The complex entertainment facility 10 includes theme parks having different themes. For example, the complex entertainment facility 10 includes an athletic park 12, an amusement park 14, an aquarium 16, and a zoo 18 as theme parks. Characters of virtual objects are set for each of the theme parks 12 to 18 based on their respective themes. As will be described later, the virtual objects are used to guide users of augmented reality (AR) display devices 30 to the theme parks 12 to 18.

The characters of the virtual objects are set that match the theme and the concept of each of the theme parks 12 to 18. For example, for the athletic park 12, characters such as adventurers, rangers, and ninjas are set as the virtual objects. For example, for the amusement park 14, characters such as clowns and go-karts are set as the virtual objects. For example, for the aquarium 16, characters such as dolphins, goldfish, and sharks are set as the virtual objects. Further, for example, for the zoo 18, characters such as elephants, pandas, and giraffes are set as the virtual objects. The information on these set virtual objects is stored in a theme park-specific character storage unit 82 (see FIG. 3) of a server 70. Details of the stored virtual object information will be described later.

The theme parks 12 to 18 are paid facilities, for example, and the users of the theme parks 12 to 18 are counted. This count is performed, for example, by an entrance-exit gate device (not shown) provided in each of the theme parks 12 to 18. The counted number of users for each of the theme parks 12 to 18 is stored in a park user storage unit 80 (see FIG. 3) of the server 70.

A beacon transmitter 22 (see FIG. 1) is provided in the connecting passage 20 connecting the theme parks 12 to 18. A plurality of transmitters 22 are provided on the connecting passage 20, for example, at equal intervals. For example, the transmitter 22 is attached to the upper end of a support column 28 for guidance display. As will be described later, when a beacon receiver 37 (see FIG. 2) of the AR display device 30 receives a signal from the transmitter 22, the current position of the AR display device 30 can be acquired.

The guidance display system according to the present embodiment includes the AR display device 30 and the server 70. As will be described in detail below, in the guidance display system according to the present embodiment, display of guidance to the destination is performed with the theme parks 12 to 18 as the destinations.

Configuration of Server

Figure 2:
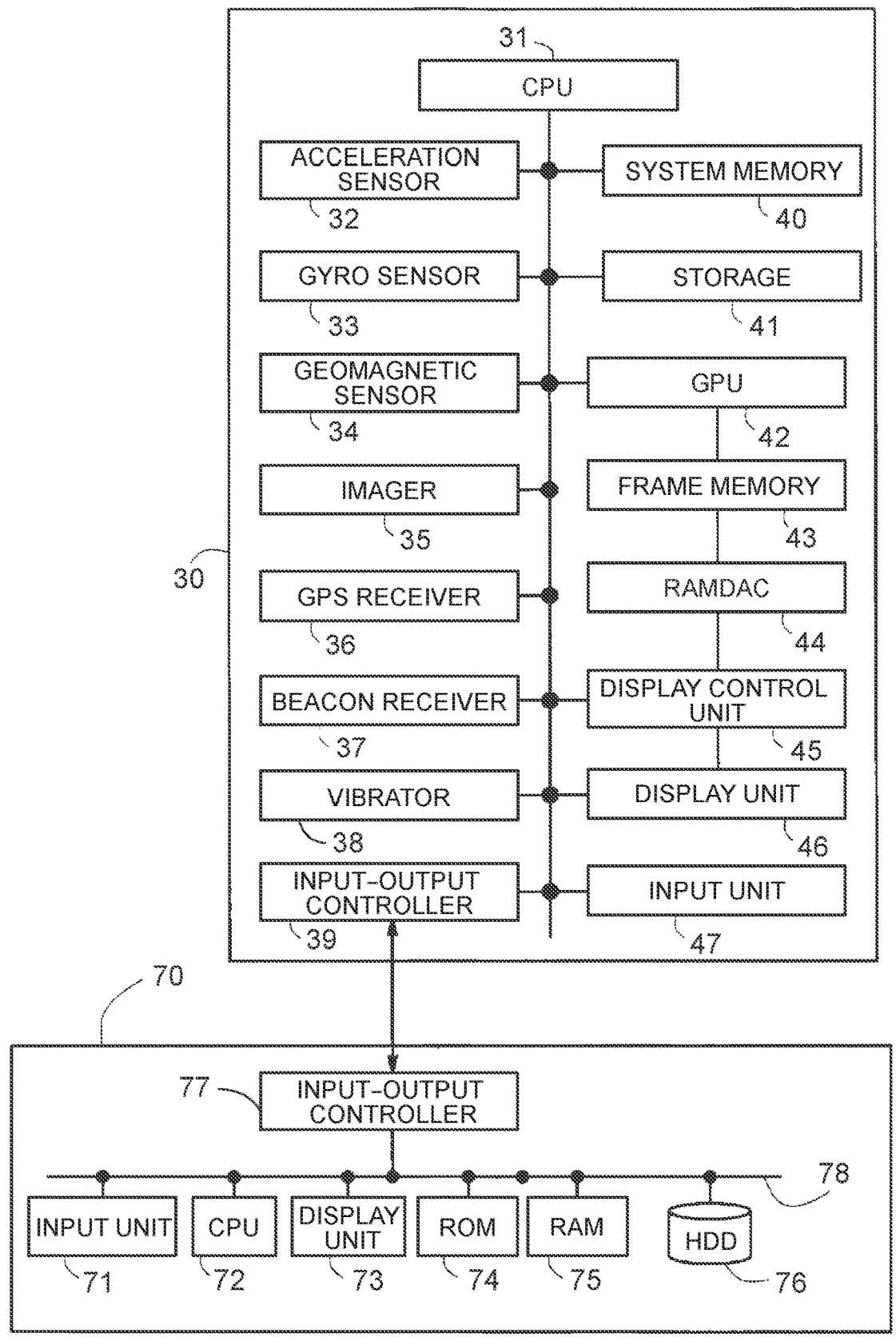
FIG. 2 is a diagram illustrating hardware configurations of a display device and a server of the guidance display system according to the present embodiment.

FIG. 2 illustrates hardware configurations of the AR display device 30 and the server 70. The server 70 is composed of, for example, a computer. The server 70 is wirelessly connected to the AR display device 30 by communication means such as a wireless local area network (LAN). The server 70 includes an input unit 71 such as a keyboard and a mouse, a central processing unit (CPU) 72 serving as an arithmetic device, and a display unit 73 such as a display. The server 70 also includes a read-only memory (ROM) 74, a random access memory (RAM) 75, and a hard disk drive (HDD) 76 as storage devices. Further, the server 70 includes an input-output controller 77 that manages input and output of information. These components are connected to an internal bus 78.

Figure 3:
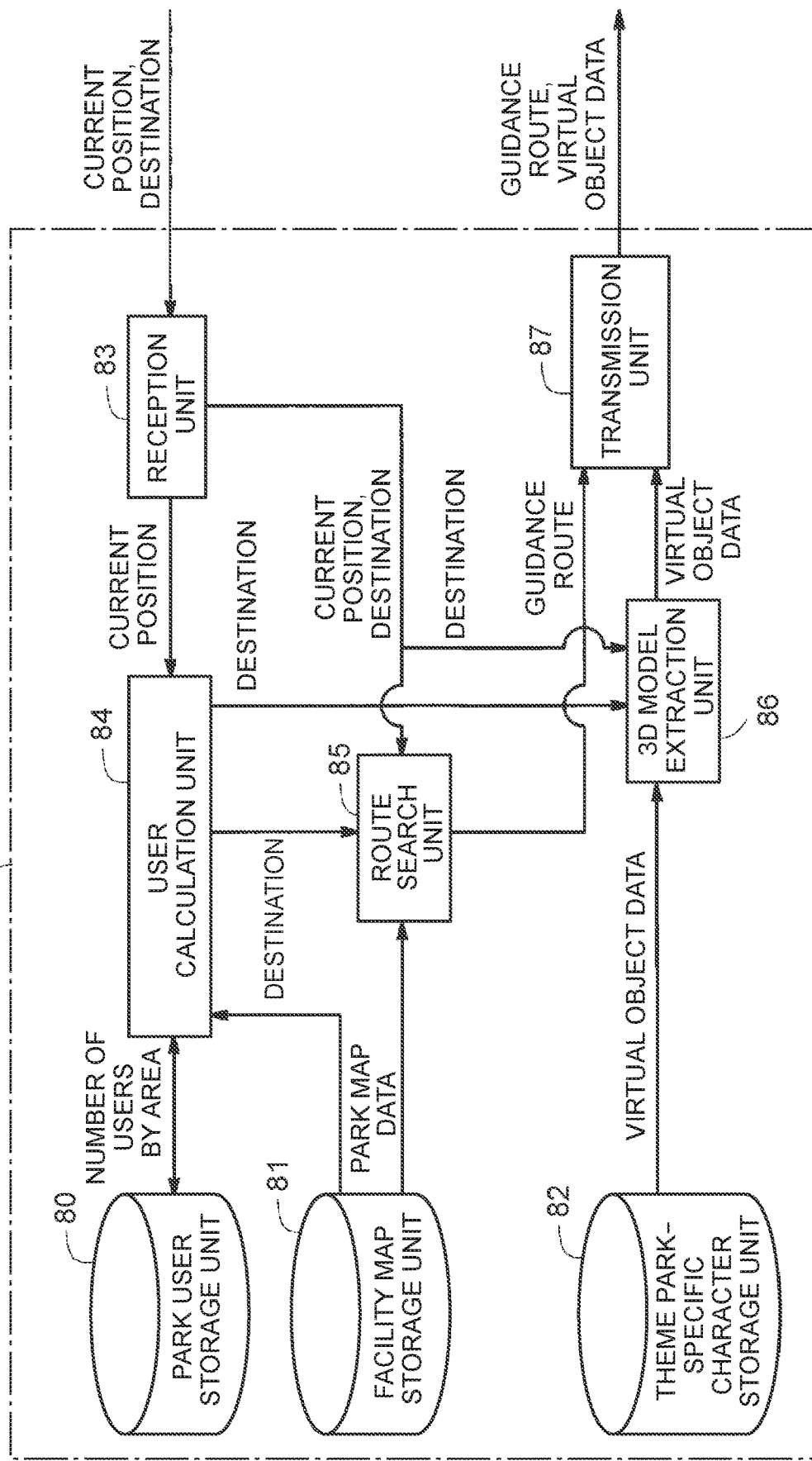
FIG. 3 is a diagram illustrating functional blocks of the server.

FIG. 3 illustrates functional blocks of the server 70. The functional block diagram is configured such that the CPU 72 executes a program stored in, for example, the ROM 74 or the HDD 76 or stored in a non-transitory storage medium such as a digital versatile disc (DVD).

The server 70 includes a reception unit 83 that receives signals from external devices such as the AR display device 30, the entrance-exit gate device (not shown). The server 70 also includes a user calculation unit 84, a route search unit 85, and a three-dimensional (3D) model extraction unit 86 that receive a signal from the reception unit 83. Further, the server 70 includes a transmission unit 87 that transmits a signal generated in the server 70 to an external device such as the AR display device 30.

Further, the server 70 includes the park user storage unit 80, a facility map storage unit 81, and a theme park-specific character storage unit 82 as storage units. The park user storage unit 80 stores the number of users and the user density of each of the theme parks 12 to 18.

The facility map storage unit 81 stores map information of the complex entertainment facility 10. For example, position information of passages and facilities in the complex entertainment facility 10 is stored. In addition, the facility map storage unit 81 stores attribute information and position information of warning target objects, such as fences installed in the connecting passage 20 and ponds provided along the connecting passage 20. Further, area information of each of the theme parks 12 to 18 is stored in the facility map storage unit 81.

The theme park-specific character storage unit 82 stores character information set for each of the theme parks 12 to 18. The character information may be, for example, 3D model data of each character. The 3D model data includes, for example, 3D image data of a character, and the 3D image data includes shape data, texture data, and motion data.

The user calculation unit 84 calculates the number of users of each of the theme parks 12 to 18 based on information on the people entering/exiting that is transmitted from the entrance-exit gate device (not shown) of each of the theme parks 12 to 18. The information on the calculated number of users is stored in the park user storage unit 80.

Further, the user calculation unit 84 calculates the user density (number of users/area of theme park) of each of the theme parks 12 to 18 with reference to the facility map storage unit 81. The information on the calculated user density is stored in the park user storage unit 80.

As will be described later, when the navigation function by the AR display device 30 is not being executed, the user calculation unit 84 sets the destination of the AR display device 30 based on the user density of each of the theme parks 12 to 18.

The route search unit 85 creates a route (guidance route) to any of the theme parks 12 to 18 that is set as the destination by the navigation function of the AR display device 30 or the user calculation unit 84. For example, when the current position is transmitted from the AR display device 30, the route search unit 85 creates a route (guidance route) from the current position of the AR display device 30 to the theme park, out of the theme parks 12 to 18, that is set as the destination, based on the map information of the complex entertainment facility 10 that is stored in the facility map storage unit 81. Guidance route data includes, for example, position coordinate information of the guidance route from the current position of the AR display device 30 that serves a departure point to the entrance of the theme park, out of the theme parks 12 to 18, that is set as the destination.

The 3D model extraction unit 86 extracts, as the virtual object for guidance, a character of the theme park, out of theme parks 12 to 18, that is set as the destination by the navigation function of the AR display device 30 or the user calculation unit 84. The virtual object data of the extracted character, that is, 3D model data, is transmitted from the transmission unit 87 to the AR display device 30 together with the guidance route.

Configuration of AR Display Device

With reference to FIG. 1, the AR display device 30 is a display device used by a user of the complex entertainment facility 10. The AR display device 30 can display a virtual reality (augmented reality (AR)) image in which an image of a virtual object is superimposed on scenery of the real world.

The AR display device 30 can be classified by various viewpoints. For example, from a viewpoint of portability, that is, mobility, the AR display device 30 can be divided into two, namely, a portable AR display device and a stationary AR display device.

Examples of the portable AR display device 30 include a smartphone and a glasses-type head-mounted display (HMD). Examples of the stationary AR display device 30 include a head-up display (HUD) that is installed in a vehicle (mobility) moving between the theme parks 12 to 18 and that projects virtual objects onto the windshield of the vehicle.

Further, the AR display device 30 can be divided into a video see-through display (VST display) and an optical see-through display (OST display) from a viewpoint of the mode of displaying scenery of the real world. In the VST display, an imager such as a camera captures an image of scenery of the real world, and the captured image is displayed on the display. On the other hand, in the OST display, scenery of the real world is visually recognized through a see-through display unit such as a half mirror, and a virtual object is projected onto the display unit.

The AR display device 30 provided with an imager 35 (see FIG. 2), such as the smartphone mentioned above, is classified as the VST display. The head-mounted display (HMD) and the head-up display (HUD) mentioned above are classified as the OST display because the scenery of the real world is visually recognized with the windshield or the lenses of eyeglasses used as the display unit.

Figure 4:
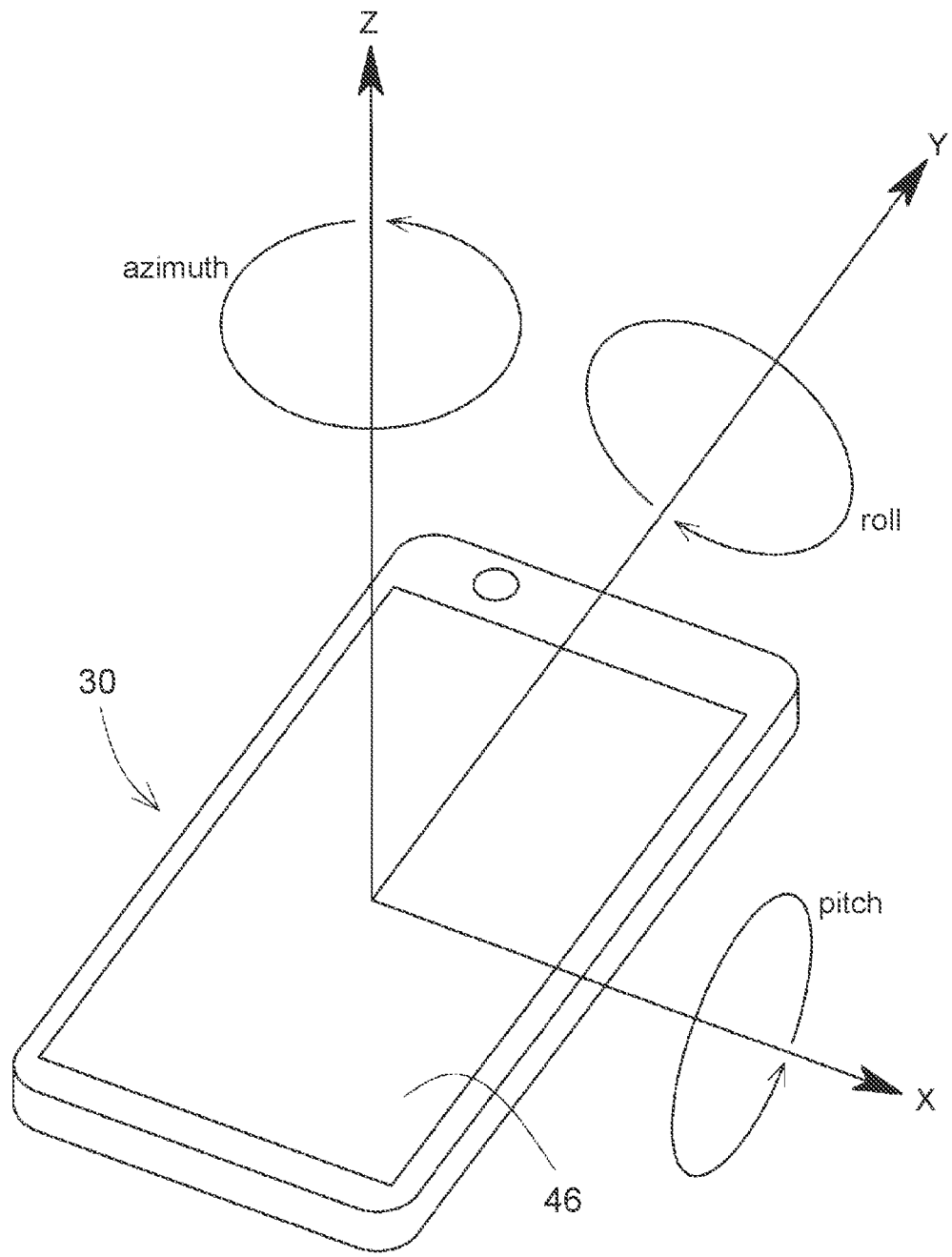
FIG. 4 is a diagram illustrating a smartphone as an example of the display device, and further illustrating reference coordinate axes of an orientation and a direction detected by the smartphone.

FIG. 4 shows a portable, VST display-type smartphone as an example of the AR display device 30. This smartphone may be property of the user of the complex entertainment facility 10, or may be a leased item such as a tablet terminal to be lent to the user of the complex entertainment facility 10.

FIG. 2 illustrates a hardware configuration of the AR display device 30 together with a hardware configuration of the server 70. The AR display device 30 includes a central processing unit (CPU) 31, an acceleration sensor 32, a gyro sensor 33, a geomagnetic sensor 34, the imager 35, a Global Positioning System (GPS) receiver 36, the beacon receiver 37, a vibrator 38, the input-output controller 39, a system memory 40, a storage 41, a graphics processing unit (GPU) 42, a frame memory 43, a RAM digital-to-analog converter (RAMDAC) 44, a display control unit 45, a display unit 46, and an input unit 47.

The system memory 40 is a storage device used by an operating system (OS) executed by the CPU 31. The storage 41 is an external storage device, and stores, for example, a program for displaying a virtual reality image (AR image), which will be described later.

The imager 35 is, for example, a camera device mounted on a smartphone, and can capture an image of the scenery of the real world as a still image or a moving image. The imager 35 includes an imaging device such as a complementary metal oxide semiconductor (CMOS) imaging device or a charge coupled device (CCD) imaging device. Further, the imager 35 may be a so-called RGB-D camera having a function of measuring the distance from the imager 35 in addition to a function of imaging the real world. As the function of measuring the distance, for example, the imager 35 is provided with a distance measuring mechanism using infrared rays, in addition to the above-mentioned imaging device.

The GPU 42 is an arithmetic device for image processing, and is mainly operated when image recognition described later is performed. The frame memory 43 is a storage device that stores an image captured by the imager 35 and further processed by the GPU 42. The RAMDAC 44 converts the image data stored in the frame memory 43 into analog signals for the display unit 46 that is an analog display.

The direction and the orientation of the AR display device 30 can be estimated by the acceleration sensor 32, the gyro sensor 33, and the geomagnetic sensor 34. The acceleration sensor 32 measures an acceleration of the AR display device 30. As illustrated in FIG. 4, the acceleration sensor 32 can measure respective accelerations in the three orthogonal axes. That is, the acceleration in each of the X-axis and Y-axis that are parallel to the display surface of the display unit 46 and orthogonal to each other, and the acceleration in the Z-axis that is orthogonal to the display surface of the display unit 46 are measured by the acceleration sensor 32. The acceleration sensor 32, the gyro sensor 33, and the geomagnetic sensor 34 are composed of so-called micromachines such as micro electro mechanical systems (MEMS).

The gyro sensor 33 measures the angular velocity of the AR display device 30. The gyro sensor 33 measures rotation around the three orthogonal axes, as illustrated in FIG. 4. That is, a pitch angle that is the rotation around the X-axis, a roll angle that is the rotation around the Y-axis, and an azimuth angle (also called a yaw angle) that is the rotation around the Z-axis are measured by the gyro sensor 33. Further, the geomagnetic sensor 34 detects an inclination of the AR display device 30 from the magnetic north.

The GPS receiver 36 receives GPS signals that are positioning signals from a GPS satellite 24 (see FIG. 1). The GPS signal includes position coordinate information of latitude, longitude, and altitude. The beacon receiver 37 receives position signals from the beacon transmitters 22 installed in the complex entertainment facility 10 including the connecting passage 20.

Here, both the GPS receiver 36 and the beacon receiver 37 have overlapping position estimation functions. Therefore, the AR display device 30 may be provided with only one of the GPS receiver 36 and the beacon receiver 37.

The input unit 47 allows input of characters and selection of the theme parks 12 to 18 serving as the destinations, which will be described later. For example, the input unit 47 may be a touch panel integrated with the display unit 46.

The display control unit 45 can display on the display unit 46 an augmented reality image (AR image) in which an image of a virtual object for guidance is superimposed on scenery of the real world. For example, the display control unit 45 extracts an image area corresponding to a guidance route (passage) from a captured image of the real world, and performs image processing (rendering) in which the image of the virtual object for guidance is superimposed on the extracted image area, so as to display the resultant image on the display unit 46. The display unit 46 may be, for example, a liquid crystal display or an organic electroluminescence (EL) display.

Figure 5:
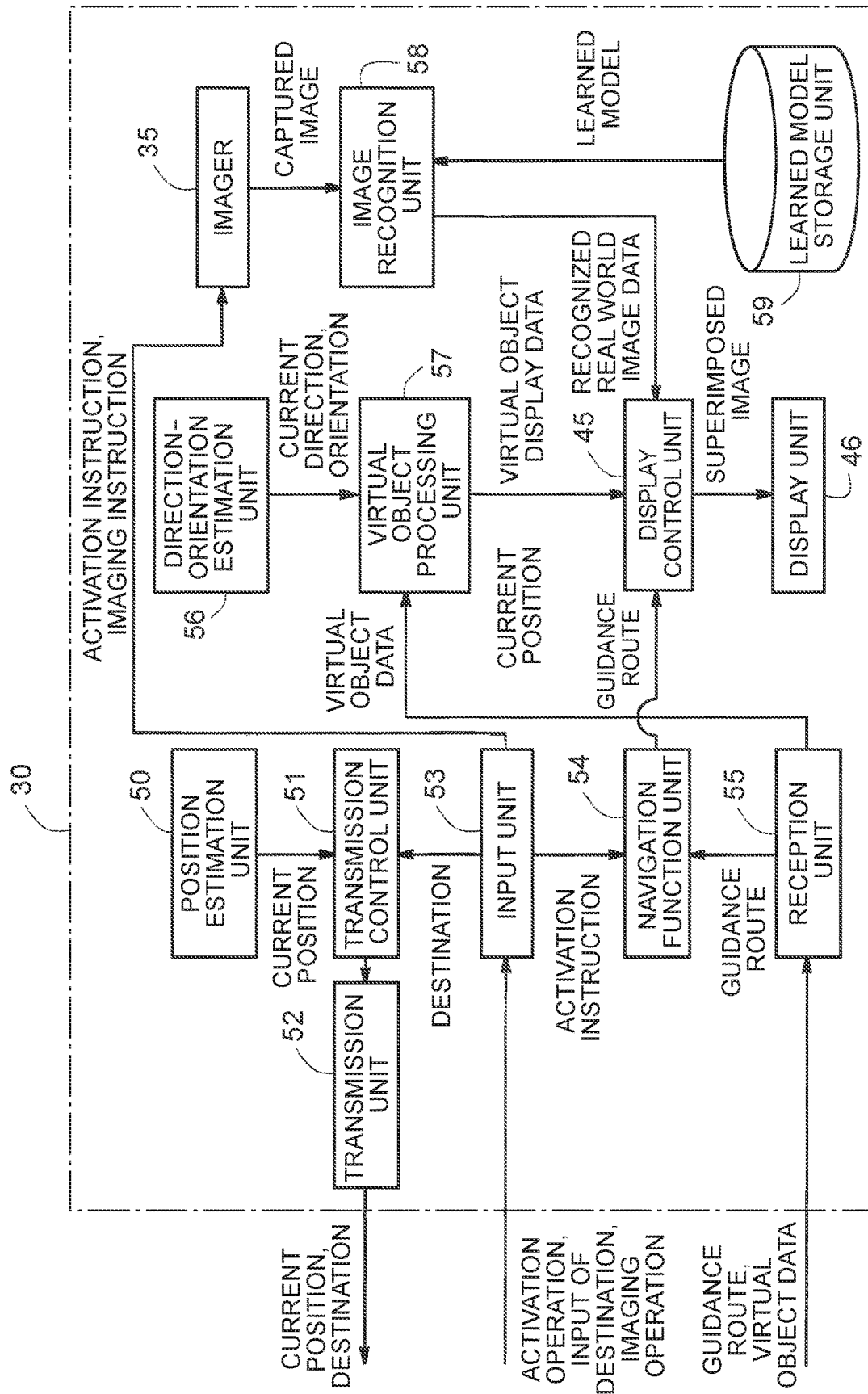
FIG. 5 is a diagram illustrating functional blocks of the display device.

FIG. 5 illustrates a functional block diagram of the AR display device 30. The functional block diagram is configured such that the CPU 31 or the GPU 42 executes a position estimation program stored in, for example, the system memory 40 or the storage 41, or stored in a non-transitory storage medium such as a DVD or a hard disk of a computer.

FIG. 5 shows a part of the hardware configuration illustrated in FIG. 2 and the functional blocks in a combined state. FIG. 5 illustrates the imager 35, the display control unit 45, and the display unit 46 as the hardware configuration.

Further, as the functional blocks, the AR display device 30 includes a position estimation unit 50, a transmission control unit 51, a transmission unit 52, an input unit 53, a navigation function unit 54, a reception unit 55, a direction-orientation estimation unit 56, a virtual object processing unit 57, an image recognition unit 58, and a learned model storage unit 59. These functional blocks are composed of the CPU 31, the system memory 40, the storage 41, the GPU 42, the frame memory 43, and the like.

The input unit 53 receives various input operations from the user of the AR display device 30. This input operation includes, for example, an imaging operation on the imager 35 of the AR display device 30, an activation operation of activating the navigation function, and an operation of inputting a destination for execution of the navigation function.

The image recognition unit 58 receives the image data captured by the imager 35 and performs image recognition. The image recognition includes recognition of objects in the captured image and estimation of the distance between each object and the AR display device 30. In such image recognition, the captured image data includes, for example, a color image data obtained by imaging the scenery of the real world as well as distance data of each object in the color image data from the imager 35, as described above.

The image recognition unit 58 recognizes the captured image using the learned model for image recognition stored in the learned model storage unit 59. The learned model storage unit 59 stores, for example, a neural network for image recognition that has been trained by an external server or the like. For example, outdoor image data containing the complex entertainment facility 10, in which each object in the image has been segmented and annotated, is prepared as training data. Using this training data, a multi-level neural network is formed that has machine-learned by supervised learning, and is stored in the learned model storage unit 59. This neural network may be, for example, a convolutional neural network (CNN).

Figure 8:
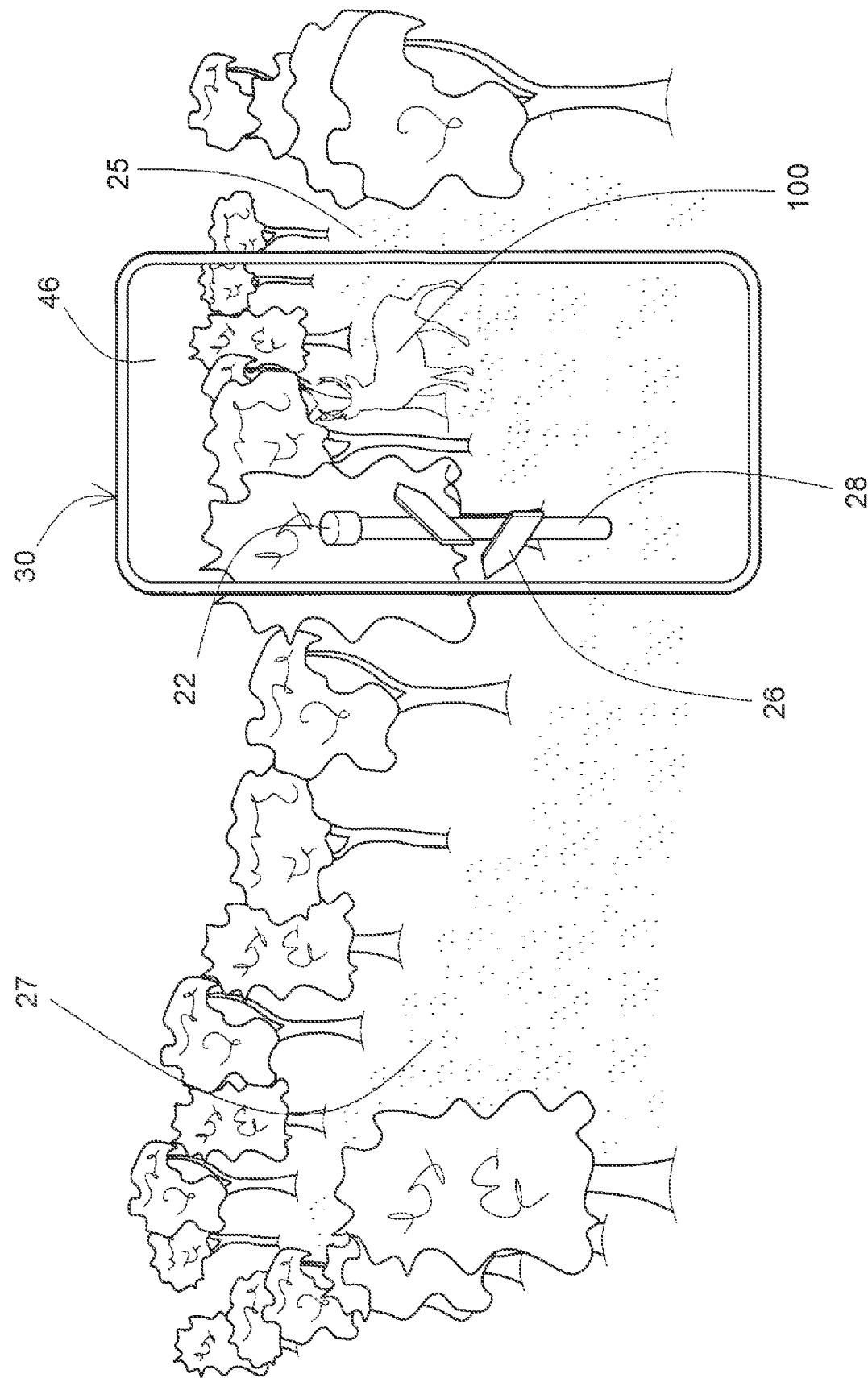
FIG. 8 is a diagram illustrating an example in which an augmented reality image is displayed on an AR display device.

The virtual object processing unit 57 obtains the posture and the direction of the virtual object for guidance that is displayed on the AR image, based on the camera angle obtained by the direction-orientation estimation unit 56. To the display control unit 45, the image of the real world that has been subjected to the image recognition and the 3D data of the virtual object for guidance for which the posture and direction information is set are transmitted. The display control unit 45 selects, from the image of the real world, a passage portion that is a part of the guidance route, and superimposes the virtual object for guidance on a position forward in the traveling direction toward the destination. This superimposed image is displayed on the display unit 46 as shown in FIG. 8 described later.

Route Guidance When User Sets Destination

Figure 6:
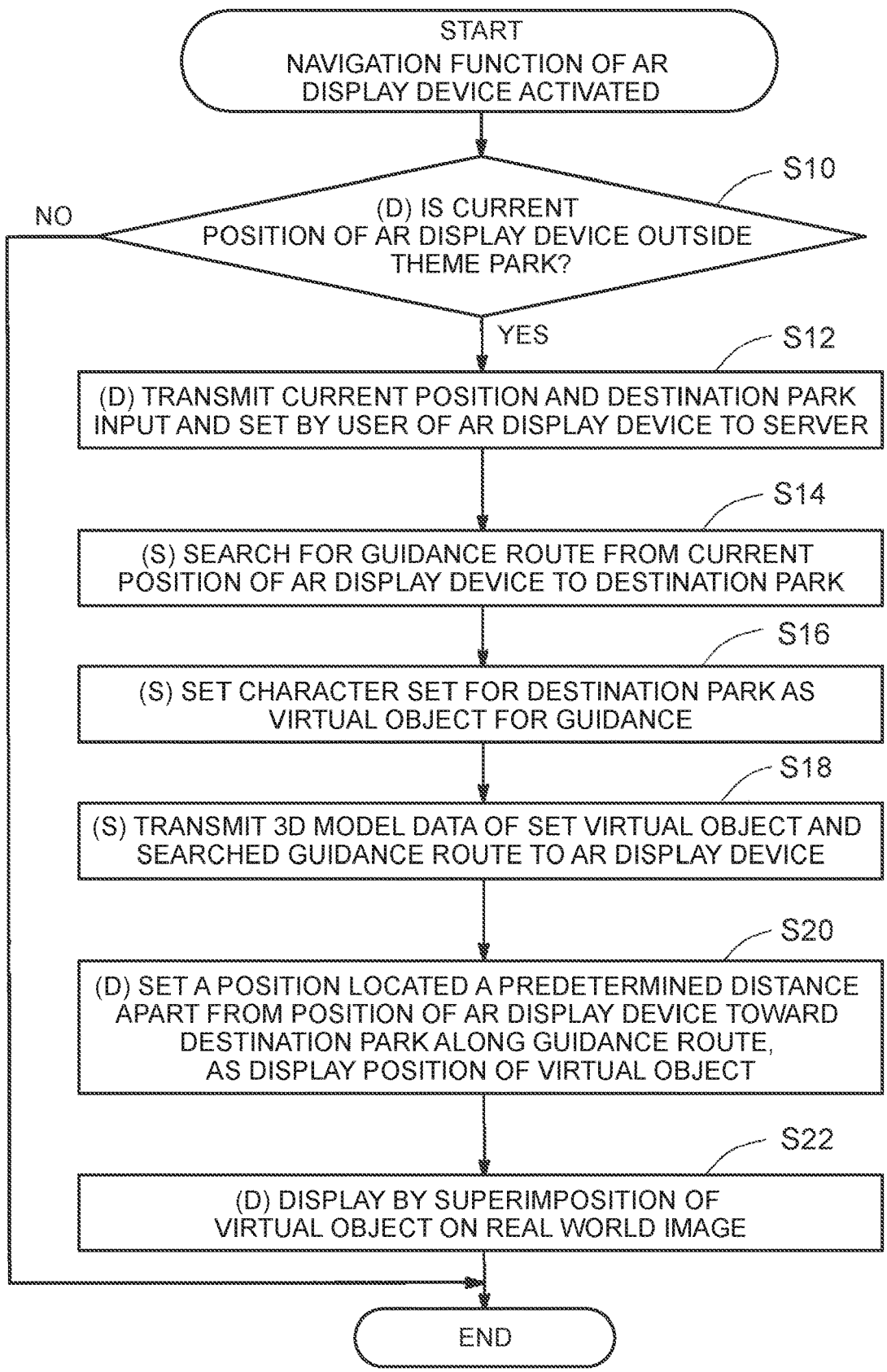
FIG. 6 is a diagram illustrating an initial setting flow of a guidance display process when a destination is set by a user.

FIG. 6 illustrates a flowchart of especially an initial setting, among route guidance processes by the guidance display system according to the present embodiment. This example shows a case where the user of the AR display device 30 activates the navigation function that is a function of the AR display device 30. In FIG. 6, the processes mainly executed by the server 70 are indicated by (S), and the processes mainly executed by the AR display device 30 are indicated by (D).

The route guidance is performed when the user is moving between theme parks in the complex entertainment facility 10 (see FIG. 1). That is, when the user is moving along the connecting passage 20, a route guidance service described below is provided.

With reference to FIGS. 3, 5 and 6, when the activation operation on the navigation function is input to the input unit 53 of the AR display device 30, the navigation function unit 54 is activated. The transmission control unit 51 determines whether the current position of the AR display device 30 is outside the theme parks 12 to 18 with reference to the current position information estimated by the position estimation unit 50 (S10).

When the current position of the AR display device 30 is within the theme parks 12 to 18, the flow of FIG. 6 is terminated. On the other hand, when the current position of the AR display device 30 is outside the theme parks 12 to 18, the transmission control unit 51 transmits the information on the current position of the AR display device 30 and the theme park that serves as the destination (hereinafter, appropriately referred to as a destination park) to the server 70 via the transmission unit 52 (S12). Here, the destination park is input or selected by the user who uses the navigation function.

The current position information of the AR display device 30 and the information on the destination park that have been received by the reception unit 83 of the server 70 are transmitted to the route search unit 85. The route search unit 85 searches for and creates a guidance route from the current position of the AR display device 30 to the destination park (S14). For example, the shortest route from the current position to the destination park is searched, and the route becomes the guidance route. The created guidance route information is transmitted to the transmission unit 87.

The information on the destination park is transmitted to the 3D model extraction unit 86. The 3D model extraction unit 86 refers to the theme park-specific character storage unit 82 to set, as the virtual object for guidance, a character set for the destination park (S16). When there is a plurality of characters set in advance for the destination park, a character among them is randomly selected, for example.

The 3D model data of the character set for the virtual object for guidance is transmitted to the transmission unit 87. The guidance route information and the 3D model data of the virtual object for guidance are transmitted from the transmission unit 87 to the AR display device 30 (S18).

The display control unit 45 of the AR display device 30 that has received the guidance route information and the 3D model data of the virtual object for guidance displays the image of the virtual object for guidance by superimposing the image of the virtual object for guidance on the image captured by the imager 35 at a position forward of the current position of the AR display device 30 in the traveling direction. The wording "forward in the traveling direction" refers to a direction extending from the AR display device 30 toward the destination park along the guidance route. For example, the display control unit 45 sets a point in the image region recognized as the passage, of the image captured by the imager 35, which is located a predetermined distance apart from the AR display device 30 toward the destination park, as a display position (superimposing position) of the virtual object for guidance (S20). Further, the display control unit 45 causes the display unit 46 to display a superposed image (AR image) in which the virtual object for guidance is superimposed on the scenery of the real world (S22).

Figure 7:
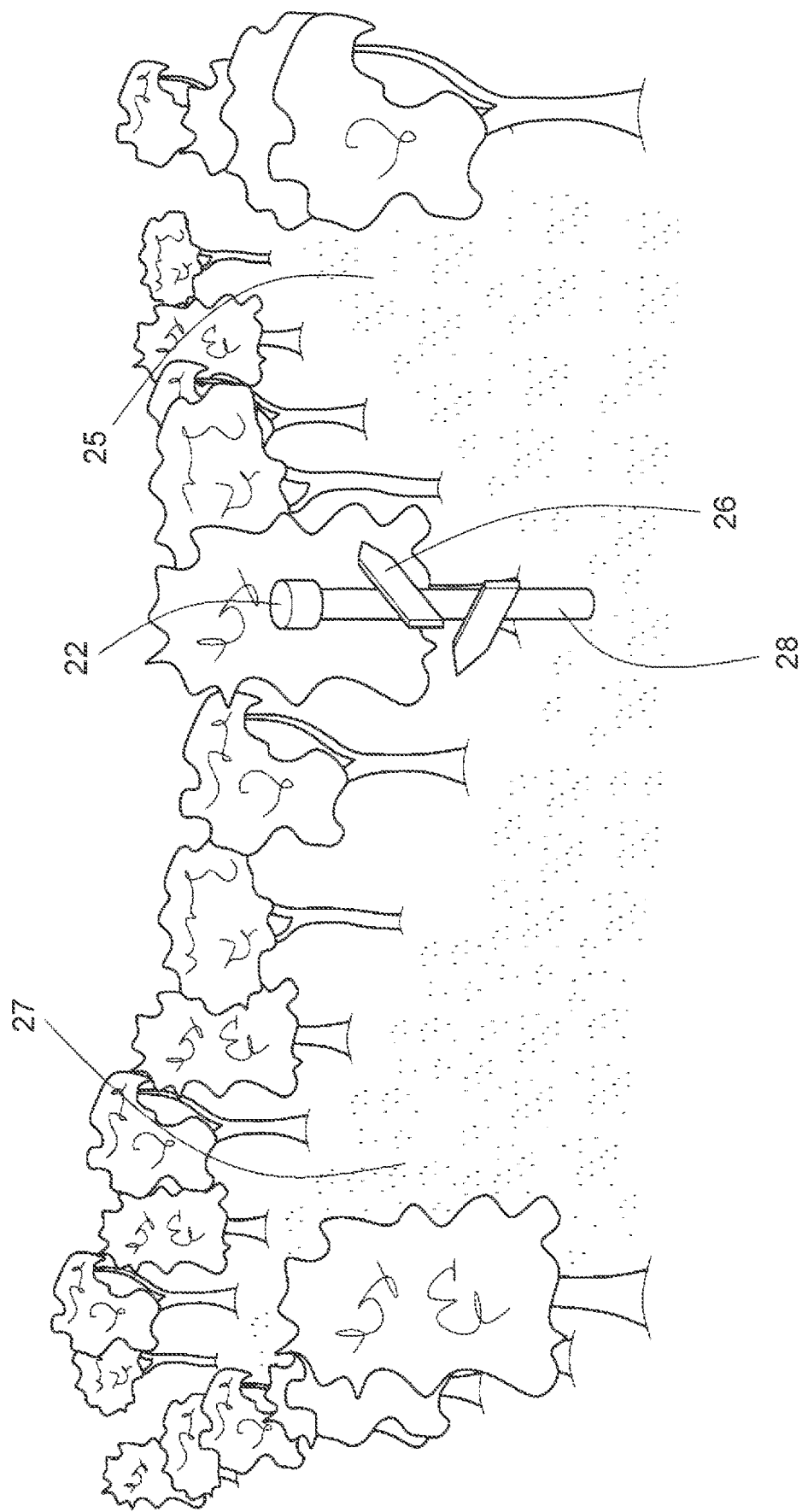
FIG. 7 is a diagram illustrating scenery of the real world.

For example, FIG. 7 illustrates a perspective view (perspective) of the connecting passage 20. FIG. 7 illustrates a case of standing at a branch point to a route 25 toward the zoo 18 and a route 27 toward the amusement park 14. In this example, it is assumed that the zoo 18 is selected as the destination park. As shown in FIG. 8, when the image of this point is captured by the imager 35 of the AR display device 30, the image recognition unit 58 recognizes the captured image and identifies the route 25, a guidance plate 26, and the like.

Further, an image of a deer serving as a virtual object 100 for guidance is superimposed on the identified route 25 at a position apart from the AR display device 30 toward the destination park (zoo 18). In FIG. 8, the virtual object 100 for guidance is drawn with a flat silhouette in order to clarify the illustration. However, the present disclosure is not limited to this form, and a 3D image of the virtual object 100 for guidance may be displayed.

When the AR display device 30 advances along the route 25 toward the destination park, the virtual object 100 for guidance also moves forward accordingly. At this time, an animation in which the deer of the virtual object 100 for guidance moves forward may be displayed.

As described above, in the guidance display system according to the present embodiment, the virtual image for guidance that matches the destination park is selected. Therefore, the route guidance can be performed without impairing the concept of the destination park.

Route Guidance for Alleviating Congestion

In the flow of FIG. 6, the user of the AR display device 30 activates the navigation function to set the destination park. However, the guidance display system according to the present embodiment can also be used for the purpose of alleviating congestion.

Figure 9:
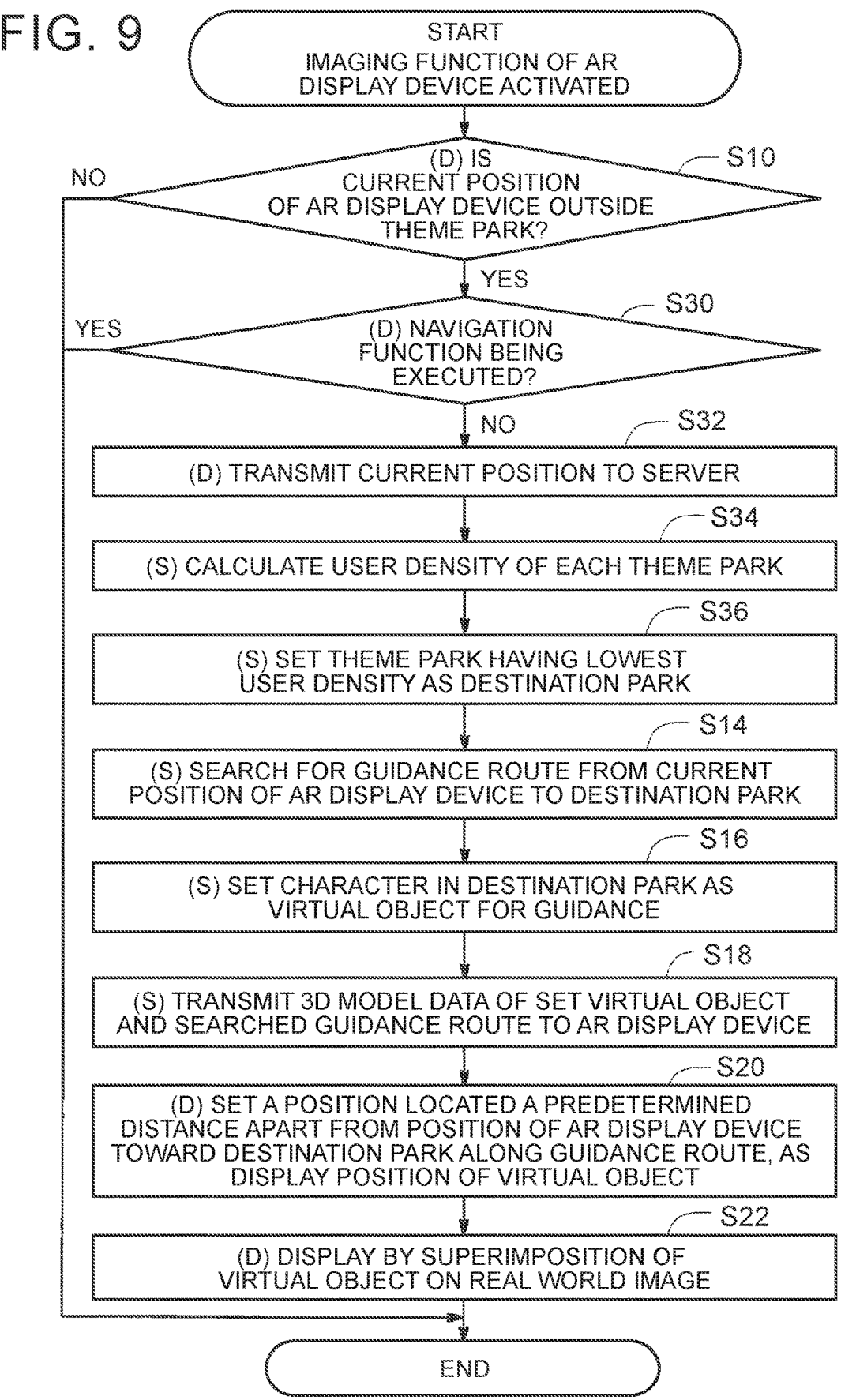
FIG. 9 is a diagram illustrating an initial setting flow of a guidance display process when the destination is set by the server.

FIG. 9 illustrates a flowchart of especially an initial setting, among route guidance processes for alleviating congestion. Since the steps with the same reference signs as those in the flow of FIG. 6 have the same content as that in FIG. 6, the description thereof will be omitted below as appropriate.

This flow is started when the imaging function of the AR display device 30 is activated. The transmission control unit 51 (see FIG. 5) determines whether the current position of the AR display device 30 is outside the theme parks 12 to 18 with reference to the current position estimated by the position estimation unit 50 (S10). When the AR display device 30 is located within the theme parks 12 to 18, this flow ends.

When the AR display device 30 is located outside the theme parks 12 to 18, typically when it is located on the connecting passage 20, the transmission control unit 51 refers to the operation status of the navigation function unit 54 to determine whether the navigation function is being executed (S30). When the navigation function is being executed, the destination park is set by the user, and thus, the flow ends.

When the navigation function is not being executed, the transmission control unit 51 transmits the current position of the AR display device 30 to the server 70 (S32). In the server 70, the user calculation unit 84 calculates the number of users of each of the theme parks 12 to 18 at the time of setting the destination park (that is, the current point in time), based on the information on the number of people entering/exiting counted by the entrance-exit gate device (not shown) of each of the theme parks 12 to 18. Further, the user calculation unit 84 acquires the area of each of the theme parks 12 to 18 from the facility map storage unit 81, and calculates the user density of each of the theme parks 12 to 18 (S34).

When the user calculation unit 84 obtains the user density of each of the theme parks 12 to 18 at the time of setting the destination park (that is, the current point in time), the user calculation unit 84 further determines a theme park, out of the theme parks 12 to 18, having the lowest user density and sets the theme park as the destination park (S36). The route search unit 85 creates a guidance route from the current position of the AR display device 30 to the set destination park. From step S36 onward, the same route guidance flow (S16 to S22) as in FIG. 6 is executed with reference to the set destination park.

For example, in general, the users of the complex entertainment facility 10 include a user group having a clear purpose of visit, such as seeing elephants of the zoo 18. On the other hand, there may be a certain number of user groups who aim to stay at the complex entertainment facility 10 for a predetermined time and have not decided which theme park, out of the theme parks 12 to 18, to go. By guiding the latter user groups to less crowded theme parks 12 to 18, the congestion rates of the theme parks 12 to 18 are smoothed, and as a result, congestion is alleviated.

Display of Virtual Object for Seeing off

In the above-described embodiment, the character set for the destination park is displayed on the display unit 46 by superimposition. However, in addition to this, the display control unit 45 may display the character of the theme park, out of the theme parks 12 to 18, that is closest to the AR display device 30 on the display unit 46 by superimposition, as a virtual object for seeing off.

For example, with reference to FIG. 3, the user calculation unit 84 provides the 3D model extraction unit 86 with information on theme park, out of the theme parks 12 to 18, that is closest to the current position of the AR display device 30 (hereinafter, appropriately referred to as nearest park), in addition to the destination park.

As described above, the 3D model extraction unit 86 extracts the 3D model data of the character set for the destination park from the theme park-specific character storage unit 82, and also extracts the 3D model data of the character set for the nearest park from the theme park-specific character storage unit 82.

The 3D model data of the characters of the destination park and the nearest park is transmitted from the transmission unit 87 to the AR display device 30 together with the guidance route information.

The display control unit 45 (see FIG. 5) of the AR display device displays the character of the destination park on the display unit 46 by superimposition as the virtual object for guidance, and displays the character of the nearest park on the display unit 46 by superimposition as the virtual object for seeing off.

The virtual object for seeing off may be processed so as not to be displayed on the display unit 46 when the character of the virtual object is separated from the set theme park, out of the theme parks 12 to 18, by a predetermined distance. By providing such an effect function, for example, it is possible to produce an effect that the character of the theme park that the user has just exited, out of the theme parks 12 to 18, sees off the user from this theme park.

Control for Warning Target Objects

Unlike VR technology, AR technology displays images of the real world, so the so-called immersive feeling is low. However, the user may come into contact with obstacles such as fences by paying close attention to the virtual object 100. Therefore, the display control unit 45 may highlight these obstacles on the display unit 46.

With reference to FIG. 5, when the image recognition unit 58 recognizes the image captured by the imager 35, the warning target objects are recognized in the captured image. The teacher data of the warning target objects is stored in the learned model storage unit 59 in advance. The warning target objects include, for example, fences, ponds, and the like.

Figure 10:
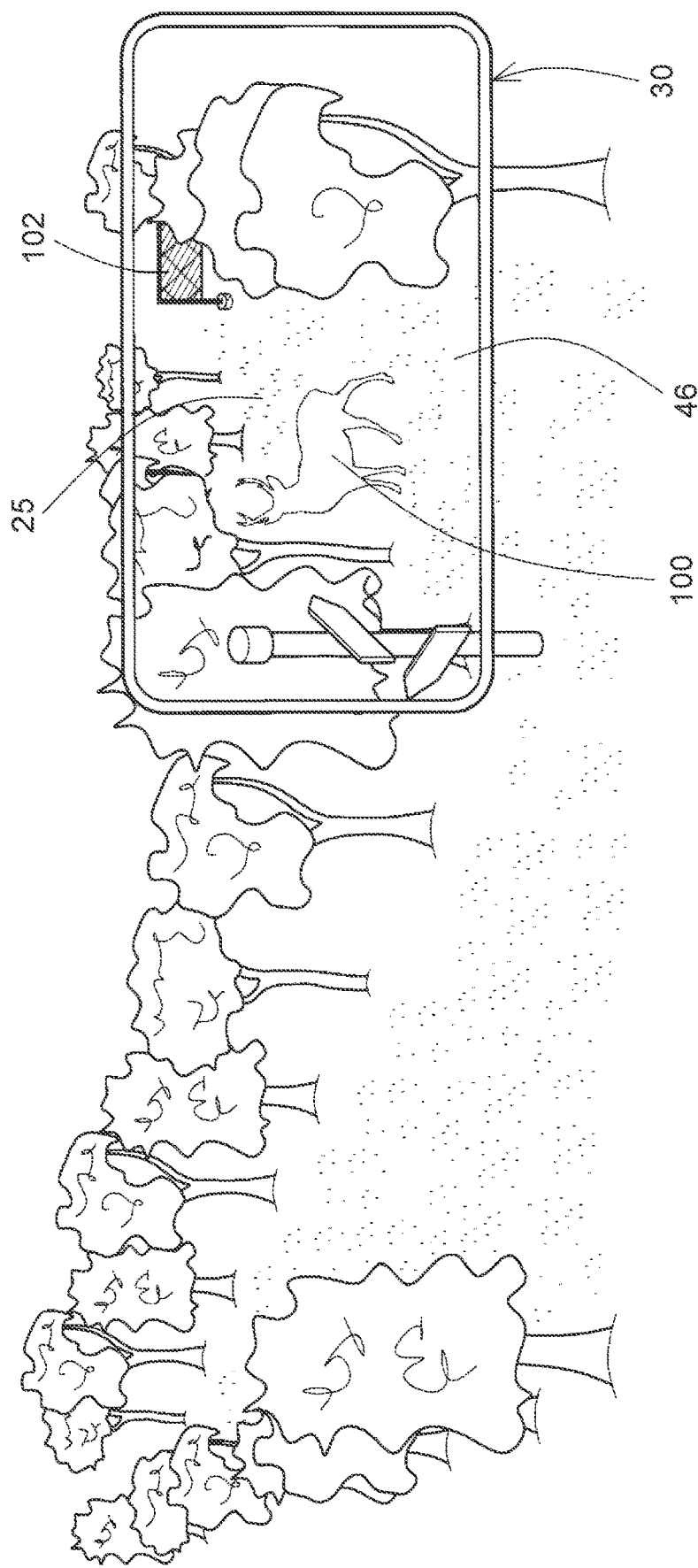
FIG. 10 is a diagram illustrating a captured image in which a warning target object is highlighted.

When displaying the captured image on the display unit 46, the display control unit 45 highlights a fence 102 that is a warning target object, as illustrated in FIG. 10. In FIG. 5, the fence 102 is hatched. With such highlighting, it is possible to call the attention of the user.

Figure 11:
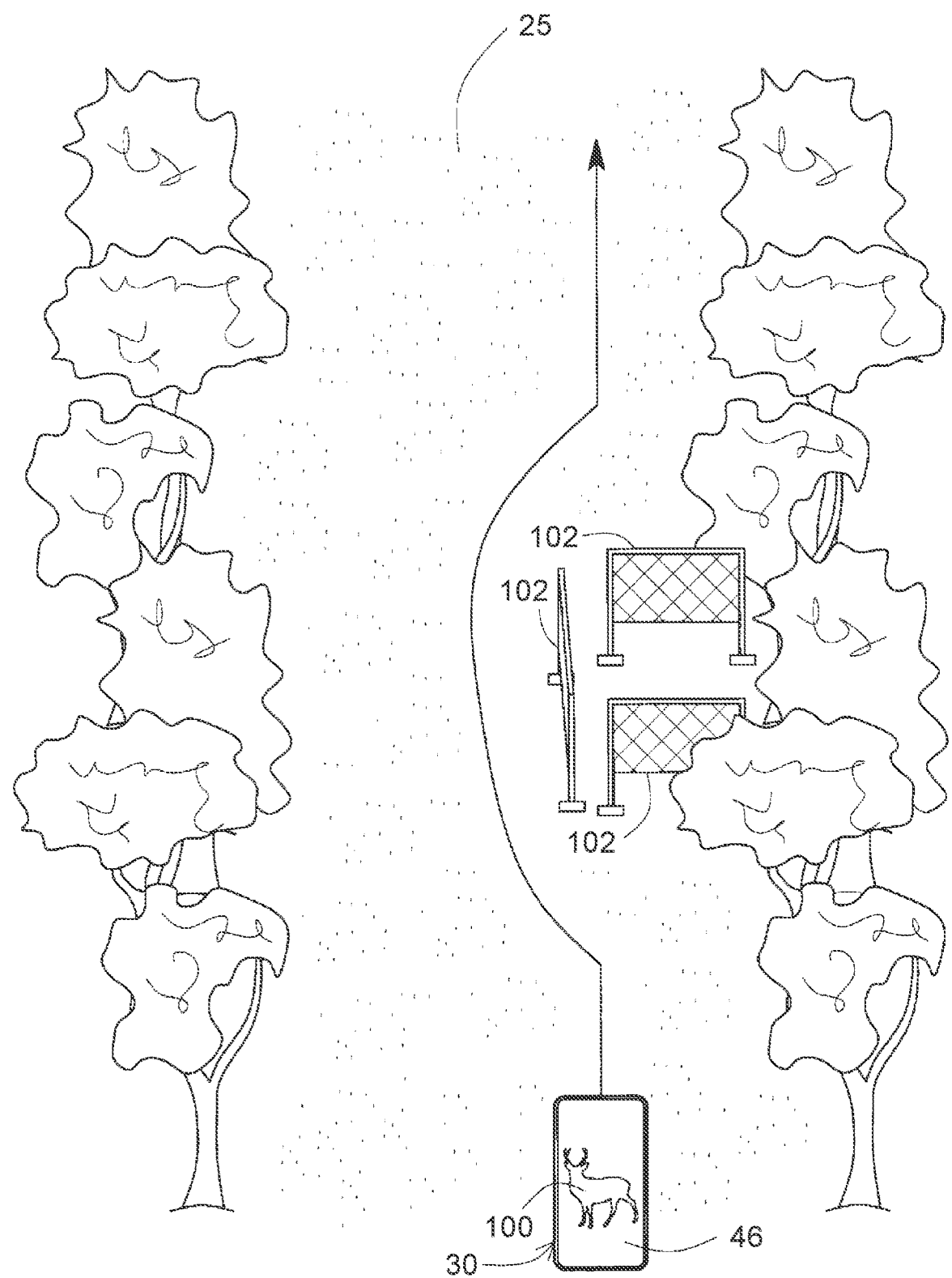
FIG. 11 is a diagram illustrating a guidance route for avoiding the warning target object.

Further, with reference to FIG. 3, when the position information of the warning target objects is stored in the facility map storage unit 81, the route search unit 85 may create the guidance route such that the guidance route functions as a route for avoiding the warning target objects, as illustrated in FIG. 11. That is, the virtual object 100 advances while avoiding the warning target objects on the display unit 46. Here, the vibrator 38 (see FIG. 2) may be driven to vibrate when the user comes close to the warning target object, thereby prompting the user to avoid contact with the warning target object.

Further, for example, it is possible to produce an effect that the virtual object 100 is removed from the frame of the display unit 46 and is no longer displayed when the imager 35 of the AR display device 30 is directed toward the warning target object. Thus, it is possible to perform safe route guidance with the virtual object 100 while avoiding contact with the warning target object.

Collision Avoidance Control

Figure 12:
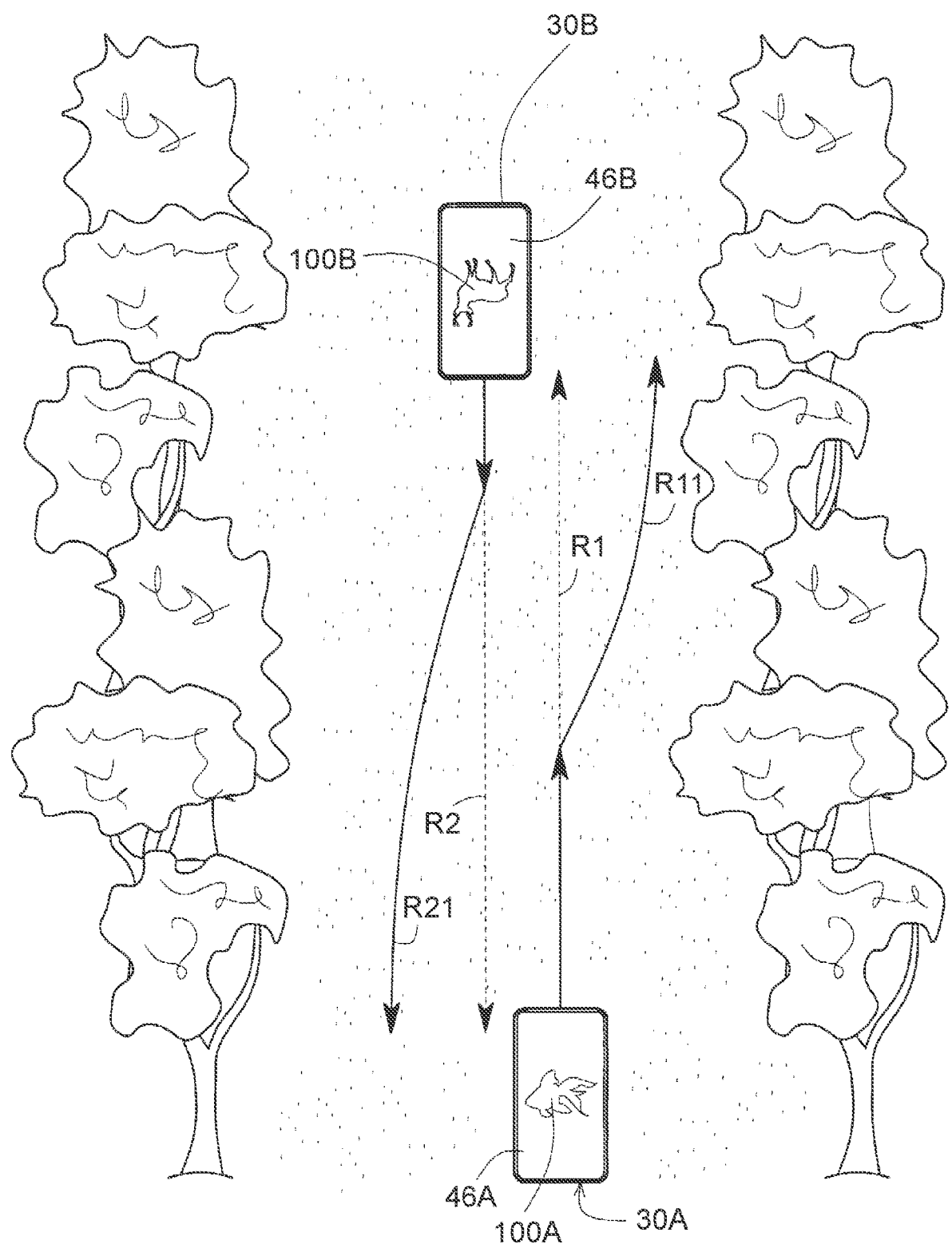
FIG. 12 is a diagram illustrating a guidance route for avoiding contact between users of the AR display devices.

As illustrated in FIG. 12, a guidance route R1 from the zoo 18 to the aquarium 16 and a guidance route R2 from the aquarium 16 to the zoo 18 may come close to each other and the users may come into contact with each other while moving. Therefore, when the plurality of AR display devices 30 come close to each other within a predetermined threshold distance, the route search unit 85 (see FIG. 3) of the server 70 may correct the initial guidance routes and recreate the guidance routes for avoiding collision.

The route search unit 85 receives the position information of all the AR display devices 30 in the complex entertainment facility 10. The route search unit 85 obtains the distances between the AR display devices 30, and recreates the guidance routes for a pair of AR display devices 30A and 30B (see FIG. 12) close to each other within a predetermined threshold distance (for example, 1 m), out of the AR display devices 30.

For example, when the users are notified that the connecting passage 20 has a right-hand traffic, the route search unit 85 creates avoiding routes R11, R21 that deviate from the initial routes R1, R2 to the right, as illustrated in FIG. 12. By recreating the guidance routes in this way, it is possible to suppress collision between the users.

Warning for Taking Out from Facility

When the AR display device 30 is a rental device used only in the complex entertainment facility 10, the server 70 may cause the display unit 46 of the AR display device 30 located outside the premise of the complex entertainment facility 10 to display a warning image, based on the position information of the AR display device 30. For example, the display control unit 45 causes the display unit 46 to display a message prompting the user to return to the complex entertainment facility 10.

Other Examples of AR Display Device

Figure 13:
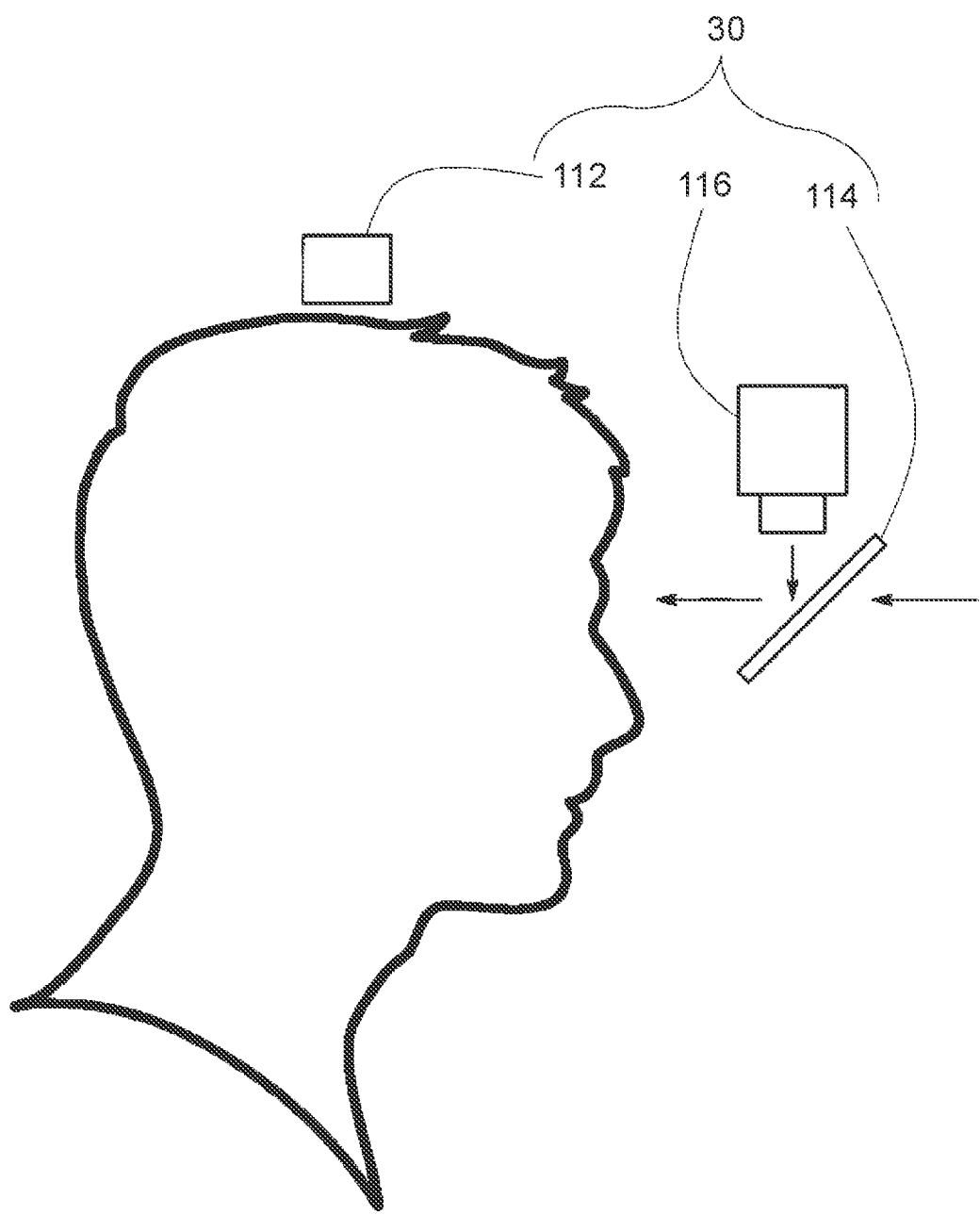
FIG. 13 is a diagram illustrating a head-mounted display (HMD) as an example of the AR display device.

In the above-described embodiment, the AR display device 30 is exemplified by a smartphone that is a video see-through display. However, the AR display device 30 according to the present embodiment is not limited to this form. For example, as in the head-mounted display (HMD) as illustrated in FIG. 13, the AR display device 30 may be composed of an optical see-through display.

In this case, the AR display device 30 includes a half mirror 114 corresponding to the display unit 46, a projector 116 corresponding to the display control unit 45, and a sensor unit 112 corresponding to the position estimation unit 50 and the direction-orientation estimation unit 56.

The half mirror 114 may be, for example, the lenses of eyeglasses or goggles. The half mirror 114 allows light (image) from the real world to be transmitted to the user. The projector 116 disposed above the half mirror 114 projects an image of the virtual object onto the half mirror 114. This makes it possible to display an AR image in which the image of the virtual object for guidance is superimposed on the scenery of the real world.

The sensor unit 112 estimates the direction and the orientation of the user's line of sight, for displaying the virtual object by superimposition. The projector 116 obtains the direction and the orientation of the 3D model of the virtual object for guidance, based on the direction and the orientation of the user's line of sight.

In the case of such an optical see-through display, the imager 35 that captures the image of the scenery of the real world may not be provided. In such a case, the flow of FIG. 9 triggered by activation of the imaging function needs to be adjusted for the optical see-through display. For example, the starting point of the flow of FIG. 9 is set to step S10, that is, the flow of FIG. 9 is modified so that the flow is activated when the user leaves any of the theme parks 12 to 18.

Figure 14:
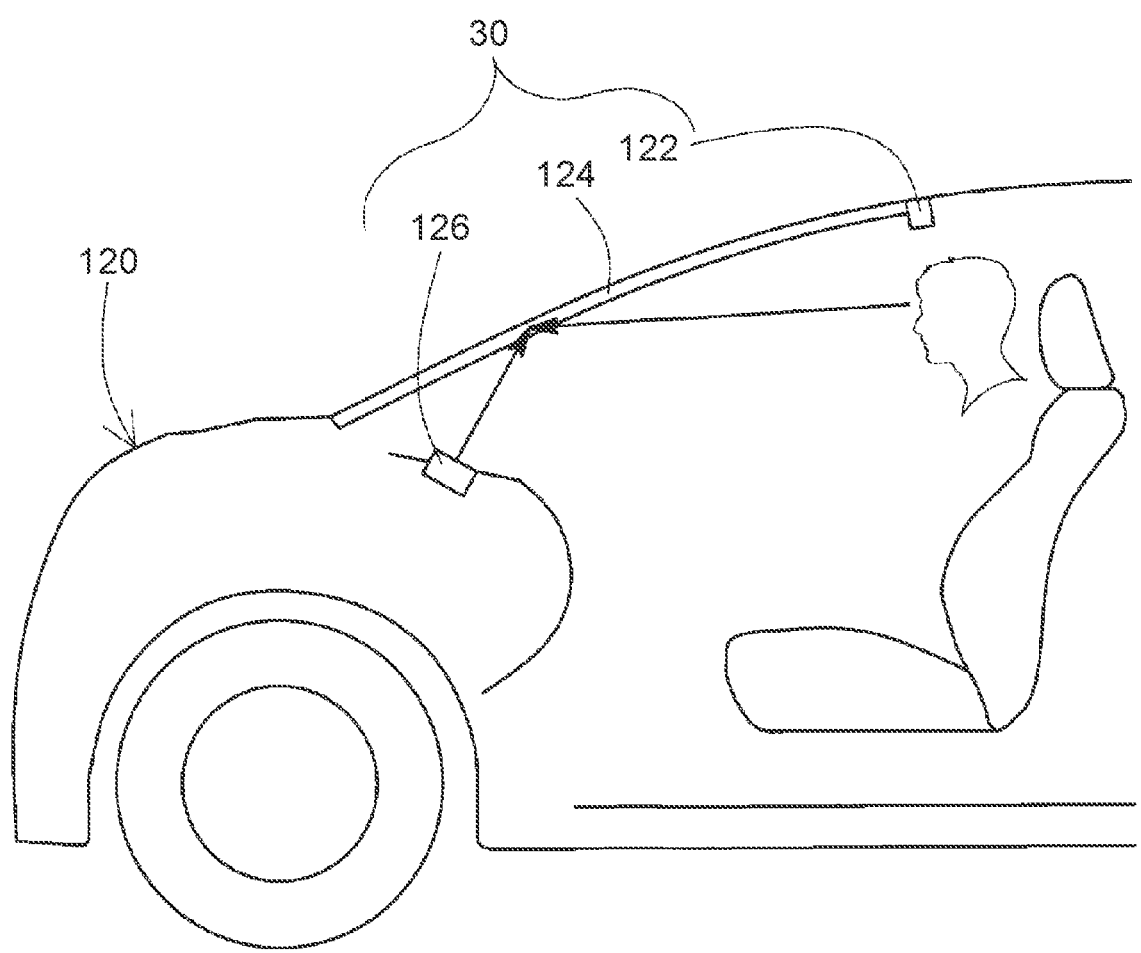
FIG. 14 is a diagram illustrating a head-up display (HUD) installed in a vehicle as an example of the AR display device.

Further, as another example of the AR display device 30 that is the optical see-through display, FIG. 14 illustrates a head-up display (HUD) that is a stationary display device installed in a moving body (mobility) such as a vehicle 120. For example, when moving between theme parks 12 to 18, the vehicle 120 travels on the connecting passage 20. The vehicle 120 may be a small vehicle having a maximum occupant of five people, for example, in consideration of movement of a family.

In this case, the AR display device 30 includes a windshield 124 corresponding to the display unit 46, a projector 126 corresponding to the display control unit 45, and a GPS receiver 122 corresponding to the position estimation unit 50.

The windshield 124 allows light (image) from the real world to be transmitted to the user. The projector 126 disposed below the windshield 124 projects an image of the virtual object onto the windshield 124. This makes it possible to display an AR image in which the image of the virtual object for guidance is superimposed on the scenery of the real world.

What is claimed is:

1. A guidance display system that displays guidance to a destination, with a facility configured based on a specific theme being set as the destination, the guidance display system comprising:
   a display device including a display unit and a display control unit configured to display, on the display unit, an augmented reality image in which an image of a virtual object for guidance is superimposed on scenery of a real world; and
   a sever wirelessly connected to the display device, wherein the server includes
   a storage unit that stores information on a character set for the facility,
   an extraction unit that extracts the character of the facility set as the destination, as the virtual object for guidance, and
   a transmission unit that transmits image data of the extracted virtual object for guidance to the display control unit,
   wherein the extraction unit is further configured to extract a character of a current facility as a virtual object for seeing a user off as they exit the current facility, the current facility being a facility closest to the display device at a time that the destination is set,
   wherein the transmission unit is further configured to transmit image data of the extract virtual object for seeing the user off as they exit the current facility to the display control unit, and
   wherein the display unit is configured to:
   display the virtual object for guidance during a period between the time at which the destination is set and a time at which the display device arrives at the destination facility, and
   display the virtual object for seeing the user out of the current facility during a period between the time at which the destination is set and a predetermined time after the display device exits the current facility.

2. The guidance display system according to claim 1, wherein the server includes
   a user calculation unit that calculates a user density of each of a plurality of the facilities, the facilities being configured based on different themes, and
   a route search unit that creates a guidance route to the destination, with a facility, out of the facilities, having the lowest user density at the time of setting the destination being set as the destination.

3. The guidance display system according to claim 2, wherein the predetermined time is a time at which the display device reaches a predetermined point along the guidance route.

4. The guidance display according to claim 3, wherein the predetermined point along the guidance route is a midway point of the guidance route between the current facility and the destination facility.

5. The guidance display system to claim 1, wherein:
   the display device includes
   an imaging unit that captures an image of the scenery of the real world, and
   an image recognition unit that recognizes an object included in the captured image; and
   when the image recognition unit recognizes a warning target object in the captured image, the display control unit highlights the warning target object on the display unit.

6. The guidance display system according to claim 5, wherein the route search unit creates the guidance route such that the guidance route functions as a route for avoiding the warning target object.

7. The guidance display system according to claim 6, wherein when a plurality of the display devices comes close to each other within a predetermined threshold distance, the route search unit recreates a guidance route for avoiding each of the display devices.

8. The guidance display system according to claim 1, wherein the display device is an optical see-through display including a half mirror through an image of the scenery of the real world is transmitted and onto which the virtual object for guidance is projected.

9. A server of a guidance display system, the server being wirelessly connected to a display device, and the display device being configured to display an augmented reality image in which an image of a virtual object for guidance is superimposed on scenery of a real world, the server comprising:
   a storage unit that stores information on a character set for a facility configured based on a specific theme;
   an extraction unit that extracts the character of the facility set as a destination, as the virtual object for guidance; and
   a transmission unit that transmits image data of the extracted virtual object for guidance to the display device,
   wherein the extraction unit is further configured to extract a character of a current facility as a virtual object for seeing a user off as they exit the current facility, the current facility being a facility closest to the display device at a time that the destination is set,
wherein the transmission unit is further configured to transmit image data of the extract virtual object for seeing the user off as they exit the current facility to the display control unit, and
wherein the display unit is configured to:
display the virtual object for guidance during a period between the time at which the destination is set and a time at which the display device arrives at the destination facility, and
display the virtual object for seeing the user out of the current facility during a period between the time at which the destination is set and a predetermined time after the display device exits the current facility.

10. The server of the guidance display system according to claim 9, wherein the server further comprises:
a user calculation unit that calculates a user density of each of a plurality of the facilities, the facilities being configured based on different themes, and
a route search unit that creates a guidance route to the destination, with a facility, out of the facilities, having the lowest user density at a time of setting the destination being set as the destination.

11. The server of the guidance display system according to claim 10, wherein the predetermined time is a time at which the display device reaches a predetermined point along the guidance route.

12. The server of the guidance display system according to claim 11, wherein the predetermined point along the guidance route is a midway point of the guidance route between the current facility and the destination facility.

* * * * *